United States Patent [19]

Huynh-Ba

[11] Patent Number: 5,502,111
[45] Date of Patent: Mar. 26, 1996

[54] PROCESS FOR MAKING POLYVINYL CHLORIDE COMPOSITIONS HAVING HIGH HEAT DISTORTION TEMPERATURES

[75] Inventor: Gia Huynh-Ba, Hockessin, Del.

[73] Assignee: E. I. Du Pont de Nemours and Company, Wilmington, Del.

[21] Appl. No.: 226,427

[22] Filed: Apr. 12, 1994

Related U.S. Application Data

[63] Continuation-in-part of Ser. No. 941,692, Sep. 8, 1992, abandoned, which is a continuation-in-part of Ser. No. 665,642, Mar. 6, 1991.

[51] Int. Cl.$^6$ .............................. C08L 27/06; C08L 27/08
[52] U.S. Cl. .......................... 525/239; 525/203; 525/205; 525/207; 525/208; 525/227; 525/238; 525/240; 525/241
[58] Field of Search ..................... 525/203, 205, 525/207, 227, 208, 239, 238, 240, 241

[56] References Cited

U.S. PATENT DOCUMENTS

| | | | |
|---|---|---|---|
| 3,629,170 | 12/1971 | Yamanouchi | 260/23 X |
| 4,246,374 | 1/1981 | Kopchik | 525/329 |
| 4,255,322 | 3/1981 | Kopchik | 260/45.75 |
| 4,595,727 | 6/1986 | Doak | 525/71 |
| 4,613,533 | 9/1986 | Loomis et al. | 428/36 |
| 4,650,824 | 3/1987 | Clikeman et al. | 524/457 |
| 4,798,868 | 1/1989 | Lordi et al. | 525/207 |
| 5,004,777 | 4/1991 | Hallden-Abberton et al. | 524/433 |

OTHER PUBLICATIONS

Paraloid® HT–510™ "Heat Distortion Temperature Modifier for Clear and Opaque PVC" Rohm & Haas Jan. 1988.
Paraloid® EXL™ "EXL™–4000 Additives" Rohm & Haas Jun. 1990.

Primary Examiner—Paul J. Thibodeau
Assistant Examiner—Mary Critharis
Attorney, Agent, or Firm—Hilmar L. Fricke

[57] ABSTRACT

Heat distortion temperature of polyvinyl chloride compositions can be significantly increased above the heat distortion temperature of uncompounded polyvinyl chloride while good appearance of extruded material is preserved by preblending an imidized acrylic resin having a glass transition temperature above 130° C. with a third polymer melt-processable throughout the temperature range of 150°–300° C. under conditions where a two-phase blend is formed, wherein the third polymer forms the continuous phase and the imidized acrylic resin forms the dispersed phase and then melt-blending the two-phase blend with polyvinyl chloride at a temperature of 150°–220° C. to form a composition in which the imidized acrylic resin forms a substantially homogeneous blend with polyvinyl chloride. It also is possible to preblend imidized acrylic resin with a third polymer with which it is compatible, for example, another imidized acrylic resin having a sufficiently low glass transition temperature to lower the resulting glass transition temperature of the preblend below about 130° C., which then is blended with polyvinyl chloride.

5 Claims, 3 Drawing Sheets

PROCESS FOR MAKING POLYVINYL CHLORIDE COMPOSITIONS HAVING HIGH HEAT DISTORTION TEMPERATURES

CROSS-REFERENCE TO RELATED APPLICATION

This is a continuation-in-part, of application Ser. No. 07/941,692 filed Sep. 8, 1992, now abandoned, which is a continuation-in-part of my application Ser. No. 07/665,642 filed Mar. 6, 1991.

BACKGROUND OF THE INVENTION

This invention relates to a process for manufacturing polyvinyl chloride compositions having improved properties such as, for example, heat distortion temperatures.

Polyvinyl chloride, sometimes hereinafter abbreviated to PVC, is an established synthetic resin with numerous applications, including components for the construction industry such as house sidings and window frames, water pipes, toys, and various household articles. PVC is a hard and brittle resin, which normally is not used as such but is compounded with processing aids, plasticizing polymers and/or liquid plasticizers, and stabilizers, which improve its processability and performance. Uncompounded PVC has a heat distortion temperature (HDT) of about 80° C., but commercially available compounded rigid PVC has an HDT of only about 60°–70° C. Some articles, where rigid PVC either is or could be used, such as building components and appliance and computer housings are subjected either at certain periods of the year or usually to intense heat caused by their exposure to the sun or by the operation of the equipment housed therein. In order for PVC to be useful in such applications, it is, therefore, important to be able to increase the HDT of compounded PVC resins above its current levels.

PVC offers a considerable price advantage over other engineering resins, but its use as a structural material has been rather limited because of its low HDT. Methods of increasing its HDT frequently also lower its impact resistance below acceptable limits.

It, therefore, would also be important for such uses to increase the HDT of PVC without significantly lowering its impact resistance. This currently can be done in two ways.

One is to add an incompatible resin having a sufficiently high glass transition temperature (Tg), e.g., higher than 130° C. and a flexural modulus of more than about 690 MPa, such as, e.g., a polycarbonate or a polysulfone resin or an inorganic filler, e.g., glass fibers, glass beads, or titanium dioxide particles. Addition of inorganic fillers suffers from the drawback that it rapidly increases the viscosity of the blend to a point of difficult workability or complete unworkability. But in either case, the maximum HDT that can be attained in this manner is about 80° C., that is, the HDT of uncompounded PVC.

The other method is to add a resin having a sufficiently high Tg and flexural modulus that is miscible with PVC. This can result in blends having an HDT higher than 80° C. Some work addressing this approach has been reported in patent literature.

U.S. Pat. No. 4,255,322 to Kopchik discloses blends of PVC with polyglutarimides, which preferably also contain a third polymer serving as impact modifier. The patentee determined that PVC and polyglutarimides are compatible, and, further, that the blends have improved HDT's. The polyglutarimides themselves, also known as imidized acrylic resins or imides of polyacrylic acids, were already described by Graves in U.S. Pat. No. 2,146,209, Schroeder in U.S. Pat. No. 3,284,425, Barabas et al. in U.S. Pat. No. 4,169,924, and Kopchik, U.S. Pat. No. 4,246,374. Certain details of the experimental work described in the Kopchik '322 patent are unclear. It is, therefore, not possible to determine by reading the examples of that patent how the components of the final compositions were blended together, although it appears that this was always done in one step. Further, the properties of the blends of Example 7 of that patent, which were supposed to o be given in Table III, are not given there or anywhere else.

U.S. Pat. No. 4,595,727 to Doak improves on Kopchik by employing a rubber-modified PVC, rather than blends containing a separate elastomeric impact modifier. Doak reports an HDT for a blend of rubber-modified PVC with 30% of polyglutarimide of 88° C. When the amount of polyglutarimide is increased to 60%, the HDT is increased to 105° C.

U.S. Pat. No. 3,629,170 to Yamanouchi et al. also discloses improved PVC compositions. The improvement is obtained by solution-blending PVC with a polysulfone resin and evaporating the solvent. This reference does not report the HDT but only the Vicat softening temperature of the resulting blends; but, even if an improvement is obtained, it is clear that solution blending is not a practical industrial way of making polymer blends. In any event, since polysulfones are incompatible with PVC, it is not expected that a significant HDT improvement could be obtained in this way.

Rohm & Haas Company, the assignee of the Kopchik patents, is offering a broad range of polyglutarimides for various uses, including a grade designated as PARALOID® HT-510 for blending with PVC and a family of higher Tg resins designated as PARALOID® EXL-4000 for blending with other engineering resins.

It is customary to melt-blend polymers on an industrial scale in continuous equipment operating at an acceptably high temperature with a short residence time. Such equipment normally would be an extruder, although various blenders or mixers also may be used. Extruders are the most convenient to use because of their high throughput, possible modular construction and ease of assembly, choice of many mixing screws, and ease of control and maintenance of process temperatures.

A resin such as a Rohm & Haas PARALOID® HT-510, which has a fairly low Tg, determined by the present inventor to be about 130° C., can be melt-blended with PVC in an extruder. Since, as a rule of thumb, the processing temperature is at least about 100° C. above the Tg, this melt-blending temperature would be at least 230° C. However, PVC begins to decompose above about 210°–220° C., and its rate of decomposition above about 230° C. is quite rapid and further increases with temperature. Accordingly, while it is possible to directly melt-extrude such blends, those high melt processing temperatures are undesirable in the industry, where it is desired to operate within the temperature range of 150°–220° C., preferably 150°–210° C. Temperatures up to about 230° C. may sometimes be tolerated but normally are not recommended. Even if a good, homogenous blend is obtained at those higher temperatures, discoloration, hydrogen chloride evolution, or other signs or decomposition frequently will be observed. Still, the amount of decomposition depends not only on the temperature but also on the residence time. A temperature of 230° C. may be quite acceptable for a residence time of less than a minute but not for several minutes.

If the same resin with a Tg of 130° C. is blended with PVC below 220° C., a complete homogeneous dispersion often is not obtained and the HDT improvement is small, usually not exceeding by much the HDT of uncompounded PVC. The situation is even more complicated when PVC, polyglutarimide, and a toughening polymer are blended together in an extruder. In addition to the fact that a complete dispersion of polyglutarimide in PVC usually is not obtained, the resulting HDT of the blend is lower than it would be in the absence of the toughening polymer, which normally is a low Tg material. The flexural (or flex) modulus of such compositions also is lower than it would be in the absence of the toughening polymer.

As the Tg of the polyglutarimide increases, it is much more difficult or impossible to directly melt-blend it with PVC under conditions normally employed in the industry. The PARALOID® EXL-4000 family has Tg values reported by the manufacturer as being in the range of 140° C. to 170° C. These resins are offered by Rohm & Haas for blending with industrial resins such as, e.g., nylon 6, polycarbonates, acrylonitrile/styrene/butadiene and styrene/acrylonitrile resins, and poly(ethylene terephthalate) to increase their heat resistance or melt strength, to improve optical properties, or to serve as carriers for pigments and other additives. Yet, they would be potentially capable of increasing the HDT of PVC to a much higher extent than can be obtained with PARALOID® HT-510 and, because they also have higher flex moduli, the resulting blends can be expected to be more rigid even when containing a toughener. Unfortunately, nobody has proposed a process for making such blends.

There is, therefore, a need for an industrially practical process for producing toughened PVC compositions with improved HDT values and acceptably high flex moduli.

SUMMARY OF THE INVENTION

According to the present invention, there is now provided a process for the manufacture of a polyvinyl chloride composition having an improved heat distortion temperature, said process comprising blending at a temperature set within a range of about 150°–220° C., preferably within a range of 160°–210° C., (A) 10–95 parts by weight of polyvinyl chloride with (B) a complementary amount, the total adding to 100 parts by weight, of a polymer blend consisting essentially of about (C) 30–85 weight percent of an imidized acrylic resin having a glass transition temperature above 130° C. and a flexural modulus of at least 690 kPa wherein at least 20% of ester groups originally present in the resin are imidized to units of the following formula (1):

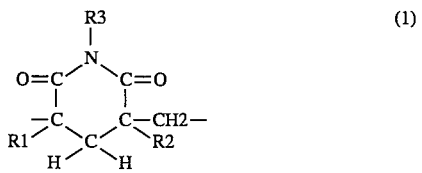

wherein each one of R1, R2, and R3 independently is hydrogen or a $C_1$–$C_{20}$ unsubstituted or further substituted alkyl, cycloalkyl, or aryl group, said imidized acrylic resin further containing 0–50 weight percent of a copolymerized ethylenically unsaturated additional monomer and being substantially free of functional groups capable of causing degradation of polyvinyl chloride within the temperature range of about 150°–220° C.; said resin being melt-processable at a temperature within the range of about 200 to 300° C.; and (D) 15–70 weight percent of a third polymer, which is melt-processable throughout the temperature range of about 150 to 300° C. and is substantially free of functional groups capable of causing degradation of imidized acrylic resin (C) within the temperature range of about 200°–300° C. and of polyvinyl chloride within the temperature range of about 150°–220° C.;

said blend (B) of imidized acrylic resin (C) with third polymer (D) being melt-processable below about 220° C.;

blending of polyvinyl chloride with blend (B) being conducted under such temperature and shear conditions that substantial decomposition of polyvinyl chloride is avoided; blend (B) becomes well dispersed in polyvinyl chloride; and substantially all of the imidized acrylic resin (C) forms a compatible, single-phase composition with polyvinyl chloride.

There also is provided a polyvinyl chloride composition having an improved heat distortion temperature.

DETAILED DESCRIPTION OF THE INVENTION

Figure 1:
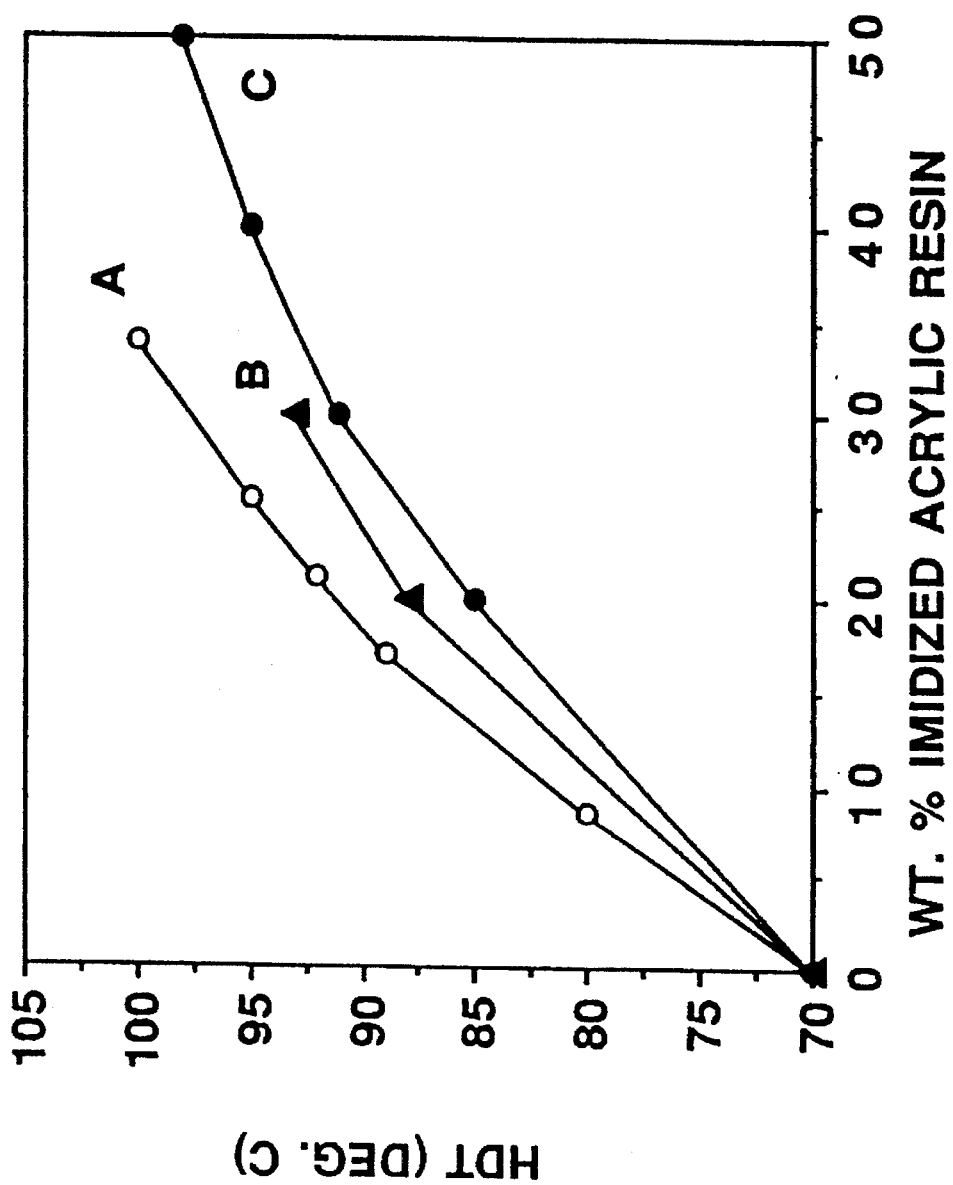
FIG. 1 is a plot of heat distortion temperatures of PVC compositions annealed at 80° C. vs. weight percent of imidized acrylic resin with Tg of 130° C. or of 155° C. in the compositions.

The term "polyvinyl chloride", as used herein, means neat polyvinyl chloride. Since the usual commercial polyvinyl chloride resin contains processing aids, plasticizers, stabilizers, and possibly other additives, the amount of polyvinyl chloride in commercial rigid polyvinyl chloride resin always is less than 100%.

The term "imidized acrylic resin" will be used herein in preference to the term "polyglutarimide" employed in the Kopchik patents. It is understood that, for the purpose of the present disclosure and claims, the term "acrylic resin" means a polymer of an acrylate ester or of an alkylacrylate, usually, methacrylate ester. It appears from the patent and technical literature that those polymers, depending on the degree of imidization of the starting polymer, may contain varying amounts of unconverted ester groups, carboxylic groups, and end-capped carboxylic groups.

The compositions made by the process of the present invention may, in addition to the recited components, contain an additional polymeric additive (E) to serve as a toughening agent. However, polymer (D) itself or a combination of polymer (D) with any polymeric material that may already be present in commercial polyvinyl chloride or may be added to polyvinyl chloride as an internal plasticizer may serve as the toughening agent without any further additives.

The imidized acrylic resin normally will be made by the reaction of poly(alkyl alkylacrylate), preferably poly(methyl methacrylate), with ammonia or with an organic primary amine, usually but not necessarily aliphatic. Details and examples of such preparations are provided in the various earlier patents mentioned in the Background of the Invention section, which are incorporated herein by reference. Other amines that have been successfully used in the imidization step include, for example, ethylamine, isopropylamine, butylamine, dodecylamine, cyclohexylamine, and aniline. Other polymethacrylates or polyacrylates could be used in principle instead of poly(methyl methacrylate) but are considered less desirable because of their lower Tg. The organic amine most commonly employed in the imidization step is methylamine, but higher aliphatic and cycloaliphatic amines, aniline, methylphenylamines, and other substituted and unsubstituted aromatic and cycloaliphatic amines can also be employed. The molecular weight of the imidized acrylic resins employed in the PVC blends of U.S. Pat. No. 4,255,322 typically is 100,000 to 200,000, and their degree of imidization preferably is 20–60%. For the purpose of the present invention, the preferred molecular weight range is 50,000 to 200,000, and the preferred degree of imidization is 60–100%. In addition to the methacrylate or acrylate monomer, these polymers may have a smaller amount of another ethylenically unsaturated comonomer copolymerized therewith. Such additional monomers may be, for example, styrene, acrylonitrile, vinyl acetate, and methyl vinyl ether. Various imidized acrylic resins are available from Rohm & Haas Company in Philadelphia, Pa. An imidized acrylic resin sold under the designation PARALOID® EXL-4261 has a reported Tg of 160° C. Another imidized acrylic resin, sold under the designation PARALOID® EXL-4171, has a reported Tg of 170° C. This resin contains some carboxylic groups. Since carboxylic groups may cause degradation of PVC at high temperature, use ofPARALOID® EXL-4171 may cause yellowing of the blend. Various PARALOID® EXL-4000 resins may have from less than 1 to about 5 % of carboxylic groups and some may also contain a small amount of anhydride groups. Carboxylic groups apparently are formed during the imidization reaction and probably cannot be avoided. However, some grades of these resins have those carboxylic groups capped, presumably, by esterification.

Depending, i.a., on the degree of imidization of the starting acrylic polymer, the glass transition temperature, Tg, of the imidized acrylic resin (C) varies and increases as the degree of imidization increases. Those higher Tg polymers can be expected to increase the HDT of the resulting PVC composition to a higher value than lower Tg polymers. Of particular interest in the process of this invention are imidized acrylic resins having a Tg of 140° C. or higher, especially 150° C. or higher.

The present inventor has unexpectedly found that when a high Tg imidized acrylic resin is first blended with a third polymer (D) under suitable conditions, the resulting blend (B) can be readily melt-blended with PVC at temperatures not above 230° C. without causing PVC degradation; and when thoroughly blended with PVC under those conditions, virtually the entire imidized acrylic resin (C) dissolves in or forms an intimate compatible blend with PVC. This, contrary to an incompatible dispersion, can result in an increase of the composition's HDT above the HDT of uncompounded PVC. Under proper conditions, the resulting HDT of the PVC composition may be as high as 114° C. or even higher. It is preferred for economic reasons to produce high HDT PVC compositions with as high a PVC content as possible, preferably at least 40 weight percent and especially 50 weight percent of its blend with (B).

Blend (B) of imidized acrylic resin (C) with third polymer (D) normally will be a two-phase composition, wherein imidized acrylic resin (C) is dispersed in third polymer (D); i.e., polymer (D) forms the matrix (continuous phase), and resin (C) forms the dispersed phase. It is believed that a reverse two-phase dispersion, in which the imidized acrylic resin forms the continuous phase, would not be miscible with PVC under normal industrial melt blending conditions at about 190°–220° C. It is necessary for such polymer (D) immiscible with imidized acrylic resin (C) to have a Tg no higher than about 130° C.

In order to prepare a suitable blend (B), in which polymer (D) is the matrix and resin (C) is the dispersed phase, the relative viscosities of the imidized acrylic resin (C) and the third polymer (D) at their blending temperature and given shear rate should satisfy the following inequality (a)

$$\frac{MV(D)}{V(D)} \times \frac{V(C)}{MV(C)} < 1 \qquad (a)$$

where MV(C) and MV(D) are the melt viscosities, respectively, of the imidized acrylic resin (C) and the third polymer (D) at the melt processing temperature and shear rate of the blend, and V(C) and V(D) are the respective volume fractions of resin (C) and polymer (D) in blend (B).

Polymer (D) can be, in the alternative, a polymer having a Tg of less than 130° C., preferably less than 125° C., miscible with the imidized acrylic resin, so that the resulting blend is a homogeneous, single phase composition. However, the Tg of polymer (D) and the relative proportions of resin (C) and polymer (D) must be such that the blend is melt-processable below about 220° C. One skilled in the art would be able to establish by means of a simple experiment whether a given blend satisfies this requirement, and one would be able to readily adjust the relative proportions of the components to obtain a satisfactory blend.

The optional toughening polymer (E) may be any low Tg and low flexural modulus or rubbery polymer of the type customarily used for this purpose. Typically, polymer (E) would have at least one Tg of less than about 25° C. and a flex modulus of at most about 345 kPa. Representative such polymers include, for example, ethylene/vinyl acetate copolymer, acrylonitrile/butadiene/styrene copolymer, EPDM elastomer (ethylene/propylene/diene copolymer), ethylene/vinyl acetate/carbon monoxide copolymer, ethylene/butyl acrylate/carbon monoxide copolymer, ethylene/butyl acrylate/glycidyl methacrylate copolymer, ethylene/vinyl acetate/glycidyl methacrylate copolymer, ethylene/vinyl acetate/glycidyl acrylate copolymer, a methacrylate/butadiene/styrene copolymer of the type described in the above-cited U.S. Pat. No. 4,255,322, an acrylonitrile/styrene/acrylate copolymer (available from General Electric Co.), or a methacrylate/acrylonitrile/acrylate copolymer (available from Kane Ace FM Co. of Japan). Those polymers either are amorphous or have very low crystallinity. They can be uncrosslinked, slightly crosslinked, or completely crosslinked. The morphology of some of those copolymers may be core/shell or segmented as a result of sequential polymerization.

Polymer (D) can, but does not have to, belong to the same class as the above toughening polymer but it cannot have a Tg higher than about 130° C. or a melting point higher than about 220° C. Representative such additional polymers are styrene/maleic anhydride copolymer with a Tg of about 115°–120° C. (available from Arco Chemical Co. under the name DYLARK\232), poly(methyl methacrylate) with a Tg of about 100°–110° C. (available from several suppliers, including the Du Pont Company), a copolymer of methyl methacrylate with another ethylenically unsaturated monomer with a Tg of about 100°–120° C. (available from several suppliers, depending on the particular ethylenically unsaturated monomer, which can be, e.g., styrene, an acrylic ester, or vinyl acetate) and an imidized acrylic polymer with a Tg of about 130° C. (available from Rohm & Haas Company under the name PARALOID\HT-510). Polymer (D) can be branched or partially crosslinked but it cannot be completely crosslinked because this would make it very difficult or impossible to melt-blend blend (B) with PVC below 220° C.

When polymer (D) is thermodynamically compatible with imidized acrylic resin (C), as in the case of PARALOID® HT-510 and PARALOID® EXL-4000 resins, it still is possible to adjust the temperature and shear conditions so that initially those resins will maintain their separate identities, forming a two-phase dispersion, the higher Tg resin being dispersed in the lower Tg resin. Here, the above inequality (a) can be applied to good advantage. Of course, as the blending proceeds, those separate phases will tend to gradually disappear and a single-phase composition will result. Since the resulting Tg of the single-phase blend would be too high for blending it with PVC without significant decomposition of PVC, it is recommended to stop blending when the desired two-phase dispersion has been obtained.

In order to obtain the maximum HDT improvement from the addition of the imidized acrylic resin (C), it is desirable to have more than 50 volume percent of resin (C) in blend (B). When blend (B) is a two-phase dispersion, the above inequality (a) makes it possible to predict under what conditions this desirable concentration of resin (C) can be obtained. Melt viscosities MV(C) and MV(D) can be determined in any convenient manner, e.g., in a capillary melt rheometer or in a melt rheometer described in the copending patent application Ser. No. 07/544,626 of S. E. Tadros. As a rough confirmation that the desired kind of two-phase dispersion has been formed, one can squeeze a pellet of blend (B) against a hot plate at a temperature lower than the Tg of resin (C) but higher than the Tg of polymer (D). If the pellet deforms under these conditions, it indicates that polymer (D) forms the matrix. More accurate but more time-consuming techniques include scanning transmission electron microscopy and dynamic mechanical analysis, both well known to the art.

Blend (B) is melt-blended within the recited temperature range of about 150°–220° C. with commercial PVC. The optional toughening polymer (E) may be added at this stage, or may be added during the preparation of blend (B), or may first be blended with PVC before further blending with blend (B). The form in which blend (B) is employed is not critical and can be, e.g., pellets or powder. Polymer powder usually is easier to blend. Blending of PVC with blend (B) is normally performed in an extruder, which may be a single screw or a twin-screw machine and may be equipped with screws of any convenient design such as, e.g., mixing screws, corotating screws, Buss kneader screws, etc. The extruder normally is divided into zones, starting with the feed port and ending with the extrusion die, which normally are maintained at different temperatures. A typical temperature in the feed port area is about 130°–160° C. and just prior to the extrusion die about 150°–180° C. The extrusion die typically is maintained at about 160°–190° C. Temperatures along the barrel between the feed port and the extrusion die may vary from about 150° C. to about 190° C. Because shearing in the extruder produces heat, the melt temperature normally will be higher than any preset temperature for the machine and may reach, e.g., 200°–230° C. In high through-put, short residence time equipment, the PVC composition can be processed in this temperature range without significant decomposition. The first sign of decomposition is discoloration of the extrudate. If the color (usually yellow) is acceptable, then the operation may proceed under the preset temperature and residence time conditions. If the color is unacceptable, then the temperatures can be lowered or the residence time can be shortened. The extrudate can be recovered in any form but normally is obtained as a strand or a rod, which then is cut into pellets.

This invention is now illustrated by the following examples of certain representative embodiments thereof, where all parts, proportions, and percentages are by weight unless otherwise indicated.

All the polymeric materials used in the examples are first listed in the following Table I.

The Tg values of Rohm & Haas PARALOID® resins EXL-4261, and EXL-4171 were redetermined by the inventor according to ASTM standard D34 18 and were found to be 155° C., and 165° C., respectively. It is necessary in this connection to mention that the above-indicated procedure for determining Tg produces a curve which has certain characteristic points, especially onset, midpoint, and end. The ASTM standard does not require standardized reporting of the results although it prefers the onset point. Most thermal analysts prefer the midpoint. The Rohm & Haas technical bulletins apparently report the end point. All the determinations of Tg reported here and required by the claims are midpoint determinations.

HDT was determined in each case at 264 psi ( 1820 kPa) according to ASTM D-648.

Flexural modulus was determined according to ASTM D-790.

Notched Izod impact strength was determined according to ASTM D-256.

TABLE I

| Commercial or Modified Commercial PVC compositions (A1 through A4) | | |
|---|---|---|
| Composition | PVC content, % | Pigment (Y/N) |
| (A1) | 83–90 | N |
| (A2) | 87–93 | Y |
| (A3)* | 77–83 | Y |
| (A4) | 82–87 | N |

| Composition | Identification |
|---|---|
| Imidized Acrylic Resins, Rohm & Haas Acrylic Imide Copolymers (C1 through C3) | |
| (C1) | PARALOID ® HT-510, Tg = 130° C. |
| (C2) | PARALOID ® EXL-4261, Tg = 155° C. |
| (C3) | PARALOID ® EXL-4171, Tg = 165° C. |
| Third Polymer (D1 through D5/E1) | |
| (D1) | Ethylene/n-butyl acrylate/glycidyl methacrylate 66.8/28/5.2% terpolymer (Du Pont), Tg = −60° C. |
| (D2) | Ethylene/carbon monoxide/n-butyl acrylate 60:10:30 terpolymer, Tg = −60° C. |
| (D3) | Styrene/maleic anhydride 92:8 copolymer (Arco Co., DYLARK ® 232), Tg = 110–115° C. |
| (D4) | PARALOID ® (Rohm & Haas) HT-510, Tg = 130° C. |
| (D5/E1)** | Acrylonitrile/butadiene/styrene terpolymer |

*This PVC composition probably contains an impact modifier (E) because it exhibits a very ductile break in the notched Izod impact strength test (more than 1067 N. m/m)
**This polymer can be used either as polymer (D) or as polymer (E).

EXAMPLES 1–4

PVC composition (A2) was blended with imidized acrylic resin (C2), and with ethylene/n-butyl acrylate/glycidyl methacrylate terpolymer (D1) either by preblending of (C2) and (D1) or without preblending. Further, blending of (C2) with (D 1 ) was conducted under such conditions that either (D1) or (C2) was the continuous phase (matrix), the other being the dispersed phase. Blend (B1) was made as follows:

(D1), 3 kg, and 17 kg of (C2) were melt-blended at 230° C. in a Werner & Pfleiderer 30 mm twin-screw extruder and extruded into a 2–3 mm diameter strand, which was cut into pellets. The pellets, containing 85% of (C2) dispersed in 15% of (D1), were dried overnight in vacuum at 60° C. The identity of the continuous phase was confirmed by squeezing a pellet of blend (B1) against a hot plate maintained at a temperature of 110° C.

Blend (B2) had the same composition but was made in a 70 mm Buss Kneader at a temperature higher than 280° C. In blend (B2), (D 1 ) was the dispersed phase and (C2) was the continuous phase.

In Example 4, (A2), (C2), and (D1) were blended together directly.

The final polyvinyl chloride composition was made by melt-blending in a Werner & Pfleiderer twin-screw extruder equipped with trilobal 30 mm diameter screws and divided into four zones set at temperatures 160°/165°/165°/165° C. The third zone had a vacuum port located near the exit die. The total extruder charge in each case was 2.2 kg. The composition was extruded as a strand, which was pelletized and injection molded into test samples. HDT was determined in each case after annealing for 14 hours at 80° C. In addition, the appearance of the skin of the extrudate was observed in all cases.

The results are summarized in Table II, below.

TABLE II

| Example | (A2) | (B1) | (B2) | (C2) | (D1) | HDT | Skin |
|---|---|---|---|---|---|---|---|
| 1 | 100 | 0 | 0 | 0 | 0 | 60 | smooth |
| 2 | 70 | 30 | 0 | 0 | 0 | 88 | smooth |
| 3 | 70 | 0 | 30 | 0 | 0 | 86.8 | rough |
| 4 | 70 | 0 | 0 | 25.5 | 4.5 | — | very rough |

These examples show that, although the blends of Examples 2–4 had identical compositions, only the blend of Example 2, which corresponds to the present invention, had a smooth skin and improved HDT of 88° C., as compared with HDT of 60° C. for the starting PVC composition of Example 1 (control), while the blend of Example 3 (comparative) provided a smaller HDT improvement and gave an extrudate with a rough skin.

The blend of Example 4 could not be extruded continuously but produced an on-and-off strand breakage, which did not provide the required quantity of material for injection molding. A blend of this type would be very impractical for industrial practice.

EXAMPLES 5–16

These examples show that using a low Tg imidized acrylic resin such as PARALOID® HT-510, according to the teachings of U.S. Pat. No. 4,255,322, one can increase HDT of PVC only moderately, while still obtaining an extrudate with a smooth skin. However, using a high Tg imidized acrylic resin such as, for example, PARALOID® EXL-4261 and operating according to the process of that patent, an extrudate with a rough skin and increased HDT is obtained. On the other hand, when the same high Tg PARALOID® EXL-4261 is employed according to the process of the present invention, a much more significant HDT improvement is obtained, and at the same time an extrudate with a much smoother skin is produced.

It has also been found that, in order to obtain the highest possible HDT of a given PVC composition, the blend should be annealed at a temperature of about 5°–25° C. below the ultimate Tg of the blend, which can be calculated in a known manner. In these examples, both HDT and the notched Izod impact strength of the blends were determined after annealing the test bars either at 80° C. for 24 hours or at 90° C. for 14 hours. The flex modulus was determined without annealing because the flex modulus did not change drastically with annealing temperatures.

In all the experiments, polyvinyl chloride compositions were produced in the same twin-screw extruder as before. In Examples 5–12, the temperatures were set at 165°/163°/186°/165° C., and in Examples 13–16, they were set at 165°/165°/165°/165° C. The extruder charge in Examples 5–12 was 2.8 kg, and in Examples 13–16 it was 2.5 kg. Flex modulus test bars (3.18×0.635×12.7 ram) in Examples 5–16 were injection molded using a nominal 6-ounce (177 ml) machine made by HPM Co. running at a 15/15 second cycle ratio. The processing temperature was set at 180°/180°/180°/180° C., with a mold temperature of 30°/30° C. The actual melt temperature of the polymer stock was 200°–205° C.

These experiments are summarized in Table III, below, where the polymer designations correspond to those given in Table I. Example 5 is the control example. Examples 11–16 are comparative examples.

TABLE III

| Example | (A4) | (B1) | (C2) | (C1) | Flex mod. MPa | Skin Appear. | HDT 80° C. | N. Izod 80° C. N. m/m | HDT 90° C. | N. Izod 90° C. N. m/m |
|---|---|---|---|---|---|---|---|---|---|---|
| 5 | 100 | 0 | 0 | 0 | 3172 | smooth | 70 | 21.35 | — | — |
| 6 | 90 | 10 | 0 | 0 | 2965 | smooth | 76 | 21.35 | — | — |
| 7 | 80 | 20 | 0 | 0 | 2861 | smooth | 89 | 37.37 | 88 | 24.02 |
| 8 | 75 | 25 | 0 | 0 | 2896 | smooth | 92 | 37.37 | 91 | 26.69 |
| 9 | 70 | 30 | 0 | 0 | 2827 | smooth | 95 | 48.04 | 95 | 26.69 |
| 10 | 60 | 40 | 0 | 0 | 2827 | smooth | 100 | 58.72 | 104 | 37.37 |
| 11 | 80 | 0 | 20 | 0 | 2861 | rough | 88 | 90.75 | 86 | 69.39 |
| 12 | 70 | 0 | 30 | 0 | 3034 | rough | 93 | 53.38 | 96 | 53.38 |
| 13 | 80 | 0 | 0 | 20 | 3378 | smooth | 84 | 21.35 | — | — |
| 14 | 70 | 0 | 0 | 30 | 3482 | smooth | 91 | 26.69 | 89 | 18.68 |
| 15 | 60 | 0 | 0 | 40 | 3654 | smooth | 95 | 26.69 | 95 | 21.35 |

TABLE III-continued

| Example | (A4) | (B1) | (C2) | (C1) | Flex mod. MPa | Skin Appear. | HDT 80° C. | N. Izod 80° C. N. m/m | HDT 90° C. | N. Izod 90° C. N. m/m |
|---|---|---|---|---|---|---|---|---|---|---|
| 16 | 50 | 0 | 0 | 50 | 3687 | smooth | 98 | 21.35 | 100 | 21.35 |

It should be noted from Examples 11 and 12 that the direct blending process taught in U.S. Pat. No. 4,255,322 cannot be used with a high Tg imidized acrylic resin to produce a blend that would give a smooth skin extrudate, although HDT is improved. It should further be noted from Examples 11–16 that the amount of either higher Tg or lower Tg imidized acrylic resin that must be employed according to the process of said patent to appreciably increase HDT is much higher than the amount of high Tg resin used according to the process of the present invention.

In addition to increasing HDT, the process of the present invention also significantly improves the impact strength of PVC. This clearly appears from a comparison of the notched Izod impact strength data of Examples 6–10 with Example 5 and of Examples 11–16 with Example 5.

FIG. 1 is a plot of HDT vs. weight percent of imidized acrylic resin in a final blend with PVC, annealed 24 hours at 80° C. Curve A, obtained for blends with imidized acrylic resin (C2) according to the present invention, is based on Examples 5–10. It shows the highest HDT for every amount of imidized acrylic resin. Curve B was obtained for blends with imidized acrylic resin (C2) made according to the general direct blending procedure taught in U.S. Pat. No. 4,255,322. It is based on Examples 5, 11, and 12. Curve C was obtained for blends made according to the teachings of U.S. Pat. No. 4,255,322 using imidized acrylic resin (C1). It is based on Examples 5 and 13–16. The data points for curves A, B, and C have been taken from the above Table III.

Figure 2:
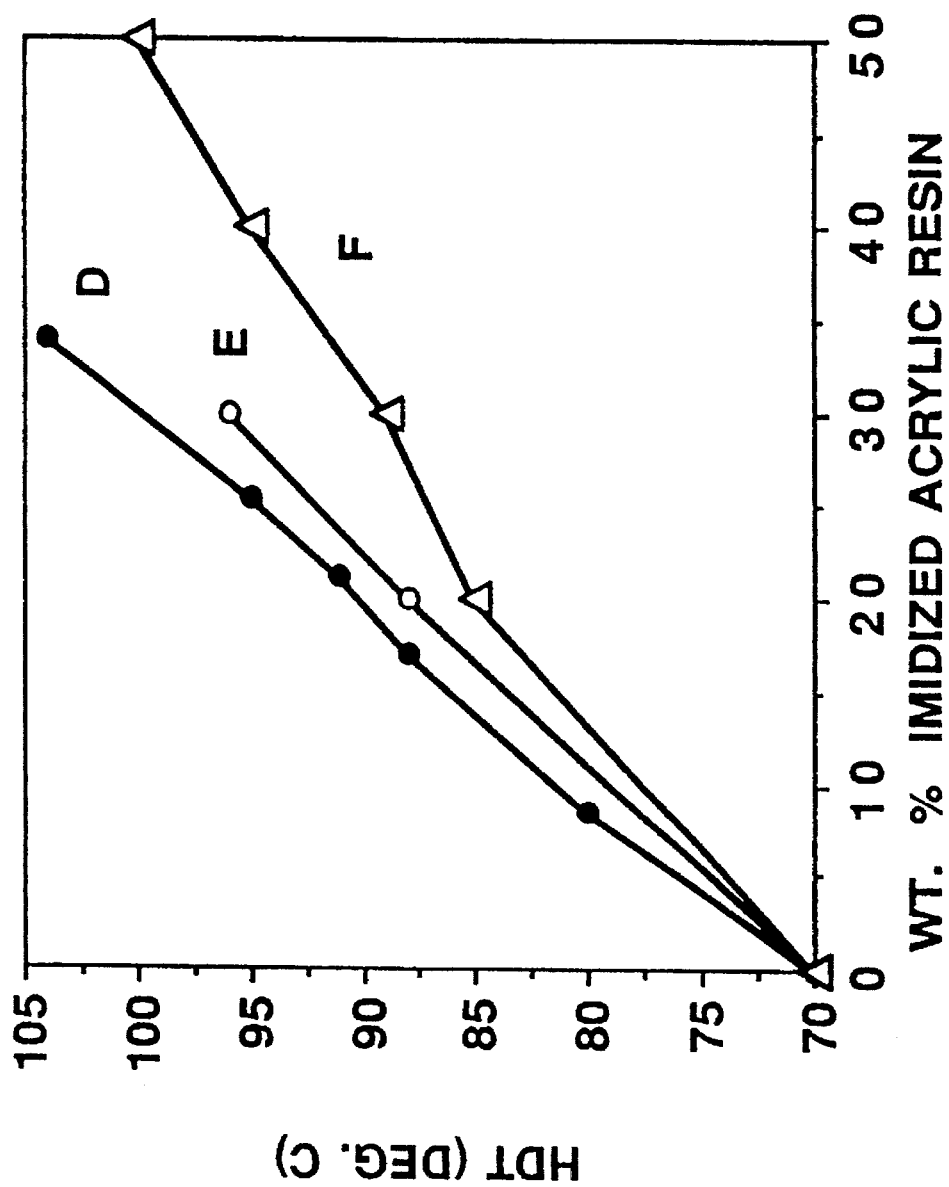
FIG. 2 is a plot of heat distortion temperatures of PVC compositions annealed at 90° C. vs. weight percent of imidized acrylic resin with Tg of 130° C. or of 155° C. in the compositions.

FIG. 2 was obtained in the same manner as FIG. 1, except that all the samples were annealed 14 hours at 90° C. In all other respects, curves D, E, and F correspond to curves A, B, and C, respectively.

Figure 3:
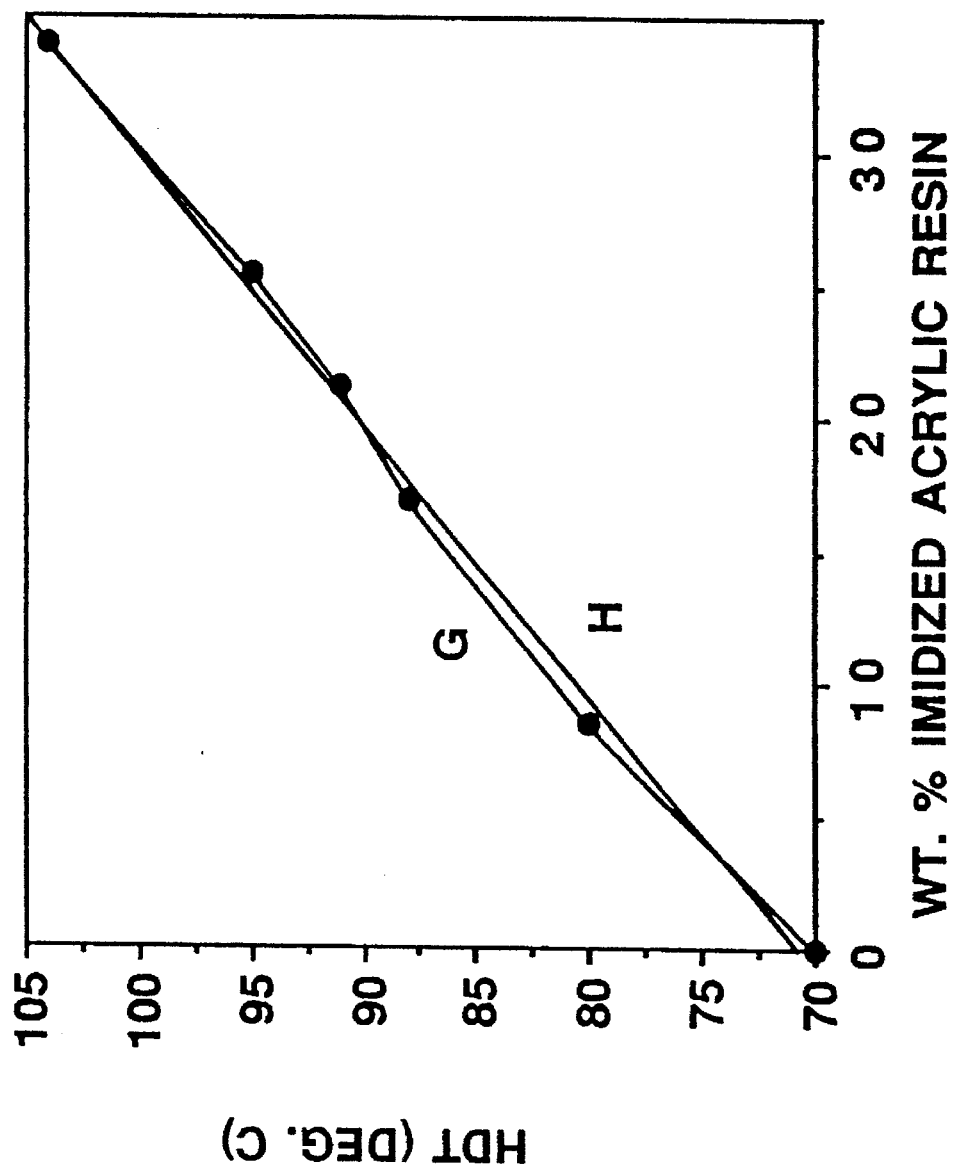
FIG. 3 is a plot of heat distortion temperatures of PVC compositions annealed at 90° C. vs. weight percent of imidized acrylic resin with Tg of 155° C. in the compositions.

In FIG. 3, curve G is a plot of HDT of samples, annealed 14 hours at 90° C., vs. amount of imidized acrylic resin according to the present invention and is based on Examples 5–10. Curve H, traced according to linear regression calculation, shows that HDT increases linearly with the weight percent of imidized acrylic resin. Under the conditions of the experiments, this increase occurred at a rate of approximately 1° C./1% of PARALOID® EXL-4261. The confidence level was 99.6%.

EXAMPLES 17–23

In these examples, powdered polymers were melt-blended directly in a molding machine without first melt-blending in an extruder. These examples demonstrate, i.a., that, while the direct molding process described in U.S. Pat. No. 4,255,322 may produce a homogeneous blend of PVC with imidized acrylic resin when the Tg of the resin is 130° C., it cannot produce a homogenous blend when the Tg of the resin is 155° C. Observations of homogeneity (one phase to a naked eye) or heterogeneity (dispersed particulates to a naked eye) and HDT data without annealing and with annealing 14 hours at 90° C. are summarized in Tables IV and IVA, below.

The designations of (A3), (A4), (C1), (C2), and (D1) are explained in Table I. Polymer blends (B1) and (B2) were the same as described in Examples 1–4.

TABLE IV

| Example | (A3) | (B1) | (C2) | (C1) | Homo- geneous Yes/No | HDT | HDT at 90° C. |
|---|---|---|---|---|---|---|---|
| 17 | 100 | 0 | 0 | 0 | — | 61 | 67 |
| 18 | 75 | 25 | 0 | 0 | Yes | 70 | 84.5 |
| 19 | 75 | 0 | 0 | 25 | Yes | 67 | 82.5 |
| 20 | 75 | 0 | 25 | 0 | No | 63 | 74 |

TABLE IV-A

| Example | (A4) | (B1) | (C2) | (D1) | (B2) | Homo- geneous Yes/No | HDT at 90° C. |
|---|---|---|---|---|---|---|---|
| 21 | 75 | 25 | 0 | 0 | 0 | Yes | 82 |
| 22 | 75 | 0 | 0 | 0 | 25 | No | 77 |
| 23 | 75 | 0 | 21.2 | 3.8 | 0 | No | 72 |

Example 17 is control, while Examples 20, 22, and 23 are comparative examples. It is apparent from Tables IV and IVA that annealed samples of the blends of the present invention (Examples 18 and 21) had HDT values above 80° C. Annealed sample of the blend of PVC with PARALOID® HT-510 resin (Example 19) also had an HDT value above 80° C. but lower than the values obtained in Examples 18 and 21. The blends of Examples 20, 22, and 23 were heterogeneous because the polymer powder could not melt flow at that molding temperature.

All the test samples were molded using the same HPM Co. molding machine described earlier, with temperatures in Examples 17–20 set at 180°/180°/180°/180° C. with the actual stock temperature of 203° C.; in Examples 21–23, the temperatures were set at 180°/185°/185°/185° C., with the actual stock temperature of 202° C.

EXAMPLES 24–33

These examples show the preparation of PVC blends containing, in addition to the required blend (B) of high Tg imidized acrylic resin (C) with a third polymer (D), an impact modifier (E). In this case, polymer (E) was present in the PVC composition supplied by the manufacturer but its identity is unknown. Table V summarizes these experiments, including the compositions; unannealed flex moduli; HDT of samples annealed at 66° C. for 24 hours, at 80° C. for 24 hours, and at 90° C. for 14 hours; and notched Izod impact strength data for unannealed samples and for samples annealed at 66° C. for 24 hours, at 80° C. for 24 hours, and at 90° C. for 14 hours.

TABLE V

| Example | (A3) | (B1) | Flex Mod. MPa | HDT/ 66° C. | HDT/ 80° C. | HDT/ 90° C. | N. Izod unanneal. N. m/m | N. Izod 66° C. N. m/m | N. Izod 80° C. N. m/m | N. Izod 90° C. N. m/m |
|---|---|---|---|---|---|---|---|---|---|---|
| 24 | 100 | 0  | 2585 | 75 | 72  | —   | 1237 | 1033 | 124 | —   |
| 25 | 90  | 10 | 2517 | 80 | 81  | —   | 1130 | 161  | 108 | —   |
| 26 | 80  | 20 | 2517 | 83 | 88  | 87  | 118  | 113  | 81  | 48  |
| 27 | 70  | 30 | 2585 | 87 | 93  | 95  | 65   | 75   | 70  | 48  |
| 28 | 60  | 40 | 2654 | 89 | 95  | 104 | 65   | 65   | 53  | 53  |
| 29 | 70  | 30 | 2758 | —  | 94  | 97  | 118  | —    | 70  | 113 |
| 30 | 60  | 40 | 2654 | —  | 95  | 103 | 102  | —    | 75  | 97  |
| 31 | 50  | 50 | 2792 | —  | 100 | 105 | 151  | —    | 97  | 113 |
| 32 | 40  | 60 | 2930 | —  | 102 | 109 | 70   | —    | 70  | 65  |
| 33 | 35  | 65 | 2965 | —  | 108 | 114 | 59   | —    | 48  | 43  |

In the above Table V, (A3) and (D1) were as defined in Table I. (B 1 ) was the same polymer blend as in Examples 1–4. defined above. All the polyvinyl chloride compositions were extruded in the above-described Werner & Pfleiderer extruder. The extruder temperatures were set as follows.

Examples 24–28:155°/165°/185°/165° C.

Examples 29–31:160°/165°/175°/165° C.

Example 32:160°/170°/175°/170° C.

Example 33:180°/180°/180°/177° C.

The extruded strands were smooth in all cases.

All the test samples were molded with the same HPM Co. machine under conditions given for Examples 17–20. The temperatures were set at 180°/180°/180°/180° C., with an actual stock temperature of 200°–205° C.

Example 33 shows a high HDT of 114° C. for a PVC composition made according to the present invention. While a control sample annealed at the same temperature was not available, samples annealed at 66° C. and at 80° C. had HDT values of 75° C. and 72° C., respectively (Example 24). The amount of polymer blend (B 1) that produced this increase of HDT was 65% of the final composition. It is a very unexpected finding that even at this high level of blend (B 1 ), and thus also of the high Tg imidized acrylic resin, a smooth strand was extruded. The same was true in all the other examples of the present invention (Examples 25–32). On the other hand, it was found in other experiments with the same imidized acrylic resin that direct blending below the PVC decomposition temperature produced rough, knotty strands at a level of about 20% of that resin.

EXAMPLES 34–37

These examples illustrate the use of an additional imidized acrylic resin, (C3), with an even higher Tg, and of a different continuous phase polymer, (D2), both of which are defined in Table I. According to Rohm & Haas literature, PARALOID® EXL-4 171 contains some free carboxylic groups. The terpolymer (D2) is melt processable between about 150° C. and 300° C. and is miscible with PVC. In these examples, the binary blend of (D2) with (C2) is designated (B3). The binary blend of (D2) with (C3) is designated (B4). Composition (A4) is defined in Table I.

Blend (B3) was made by melt blending 4.25 kg of resin (C2) with 0.75 kg of polymer (D2) in the above-described twin-screw extruder, with the temperatures set at 181°/230°/230°/230° C.

Blend (B4) was made in the same equipment from 2.1 kg of resin (C3) and 0.37 kg of polymer (D2), with the temperatures set at 180°/230°/230°/230° C.

In each case, polymer (D2) was the continuous phase, while imidized acrylic resin was the dispersed phase.

The final blends with (A4) were extruded in the same equipment, with the temperatures set at 160°/180°/180°/180° C. The extruded strands were pelletized and injection molded as before, with the temperatures set at 180°/180°/180°/180° C., the actual stock temperature being 200°–205° C.

The results of these experiments are summarized in Table VI, below, which lists, the compositions, flex moduli, notched Izod impact strengths (both unannealed and annealed 24 hours at 80° C.), and HDT values for samples annealed 24 hours at 80° C.

TABLE VI

| Example | (A4) | (B3) | (B4) | Flex Mod. MPa | N. Izod unanneal. N. m/m | N. Izod 80° C. N. m/m | HDT 80° C. °C. |
|---|---|---|---|---|---|---|---|
| 34 | 80 | 20 | 0  | 3034 | 21.4 | 32.0 | 85 |
| 35 | 70 | 30 | 0  | 2968 | 18.7 | 29.4 | 91 |
| 36 | 80 | 0  | 20 | 3206 | 13.4 | 26.7 | 74 |
| 37 | 70 | 0  | 30 | 3034 | 21.4 | 24.0 | 80 |

Here, the maximum HDT obtained was 91° C. As can be seen, the chemical structure of the third polymer, whether (D1), or (D2), or, for that matter, any other polymer (Dn), is not critical so long as it is capable of forming a binary blend with imidized acrylic resin such that this third polymer forms the continuous phase (matrix), while the imidized acrylic resin forms the dispersed phase. Ternary blends with the PVC composition (A4) having improved HDT values were obtained with both high Tg imidized acrylic resins.

EXAMPLES 38–46

These examples show the improvement of HDT with increasing amounts of blend (B1), without a drastic decrease of the impact strength or of the flex modulus.

PVC composition (A1) is defined in Table I. Blend (B1) was as described above. All the polyvinyl chloride compositions were extruded using the same extruder and procedure as in Examples 34–37, except that the temperatures were set at 165°/165°/165°/165° C. The test samples were injection molded in a nominal 1.5-ounce (44.4 ml) injection molding machine. The temperatures were set at 160°/160°/160°/170° C. for Examples 38 to 40 and at 170°/170°/170°/170° C. for Examples 41 to 46. The cycle time was 15/15, and the mold temperature was 30°/30° C.

The results are summarized in Table VII, which gives the compositions, HDT values (unannealed and annealed 24 hours at 90° C.), flex moduli (unannealed and annealed 24 hours at 90° C.), and notched Izod impact strengths (unannealed and annealed 24 hours at 90° C.).

TABLE VII

| Example | (A1) | (B1) | HDT* °C. | HDT 90° C. °C. | Flex mod.* MPa | Flex mod. 90° C. MPa | N. Izod* N. m/m | N. Izod 90° C. N. m/m |
| --- | --- | --- | --- | --- | --- | --- | --- | --- |
| 38 | 100 | 0  | 54 | 70 | 2500 | 2690 | 80.1 | 48.0 |
| 39 | 95  | 5  | 59 | 72 | 2480 | 2480 | 85.4 | 58.7 |
| 40 | 90  | 10 | 60 | 75 | 2450 | 2590 | 85.4 | 58.7 |
| 41 | 85  | 15 | 62 | 82 | 2350 | 2450 | 85.4 | 53.4 |
| 42 | 80  | 20 | 66 | 84 | 2520 | 2450 | 69.4 | 53.4 |
| 43 | 75  | 25 | 69 | 89 | 2520 | 2480 | 69.4 | 58.7 |
| 44 | 70  | 30 | 73 | 94 | 2520 | 2374 | 58.7 | 42.7 |
| 55 | 65  | 35 | 77 | 97 | 2520 | 2480 | 53.4 | 53.4 |
| 46 | 60  | 40 | 80 | 98 | 2590 | 2590 | 45.4 | 42.7 |

*unannealed

The above results show that annealing can increase HDT as much as 21° C., as compared with unannealed samples. Moreover, compared with the control Example 38, HDT was increased from 70° C. to 98° C. (Example 46) without drastically reducing the impact strength of the annealed test sample.

machine. The temperatures were set at 180°/180°/180°/180° C., with a cycle time of 20/20 seconds and a mold temperature of 30°/30° C.

The compositions and test results are summarized in Table VIII, below, which provides flex moduli, notched Izod impact strengths, and tensile strengths at yield, all without annealing; as well as HDT values for test samples annealed 14 hours at 80° C.

TABLE VIII

| Example | (A1) | (B1) | (B5) | (B6) | (B7) | (B8) | Flex mod. MPa | N. Izod N. m/m | HDT °C. | Tensile str. MPa |
| --- | --- | --- | --- | --- | --- | --- | --- | --- | --- | --- |
| 47 | 100 | 0  | 0  | 0  | 0  | 0  | 2517 | 198 | 72 | 46.2 |
| 48 | 75  | 25 | 0  | 0  | 0  | 0  | 2377 | 112 | 95 | 49.6 |
| 49 | 75  | 0  | 25 | 0  | 0  | 0  | 2758 | 91  | 81 | 57.2 |
| 50 | 75  | 0  | 0  | 25 | 0  | 0  | 2689 | 128 | 91 | 56.5 |
| 51 | 75  | 0  | 0  | 0  | 25 | 0  | 2654 | 96  | 93 | 59.3 |
| 52 | 75  | 0  | 0  | 0  | 0  | 25 | 2689 | 75  | 85 | 59.9 |

EXAMPLES 47–52

These examples illustrate the use of other mark polymers, (D3) and (D4), which are melt-processable within the range of 150–220° C.

The meaning of (A1), (C2), (C3), (D3), and (D4) is explained in Table I.

The binary blend (D3)/(C3) is designated (B5).
The binary blend (D3)/(C2) is designated (B6).
The binary blend (D4)/(C2) is designated (B7).
The binary blend (D4)/(C3) is designated (B8).

Blends B5 through B8 were made in the same twin-screw extruder as was blend (B1), with the temperatures set at 225°/240°/245°/245° C. The following amounts of components were used:

(B5): 0.3 kg of (D3) and 1.2 kg of (C3);
(B6): 0.225 kg of (D3) and 1.275 kg of (C2);
(B7): 0.225 kg of (D4) and 1.275 kg of (C2);
(B8): 0.3 kg of (D4) and 1.2 kg of (C3).

Final PVC compositions were made by extrusion using the same equipment and procedure as in Examples 47–52, except that the temperatures were set at 165°/185°/175°/175° C.

All these compositions were injection molded into 6.35× 3.18×215.9 mm tensile bars and 6.35×3.18×12.7 mm flex bars in a nominal 1.5-ounce (44.4 ml) HPM molding As can be seen, all the samples exhibited improved HDT values and tensile strengths at yield, while still retaining very respectable impact strengths. The flex moduli were very comparable to the value obtained in the control Example 47.

EXAMPLES 53–57

As shown in these examples, the present invention makes it possible to retain very good notched Izod impact strength while improving HDT of PVC compositions. Normally, these two properties are mutually incompatible, so that a good combination of these properties is difficult to realize. Because polyglutarimide is a very brittle resin, its addition to PVC for the purpose of increasing HDT of PVC according to U.S. Pat. No. 4,255,322 results in a composition with a rather low notched Izod impact strength, not above about 163 N.m/m. When an impact modifier is used to increase the impact strength, this is achieved at the expense of HDT. However, the present invention allows one to improve HDT of PVC without drastically reducing its impact strength. This is shown in Table IX, below, which summarizes the compositions, HDT values (annealed at 80° C. for 24 hours), flex moduli (unannealed), and the notched Izod impact strengths (unannealed and annealed at 80° C. for 24 hours).

PVC was composition (A3). Blend (B9) was made from 35 parts of polymer (D5/E1) and 65 parts of resin (C2).

Polymer (D5/E1) is melt-processable within the range of 150°–300° C. The designations (A3), (C2), and (D5/E1) are explained in Table I. This binary blend was made in the same extruder as used for blend (B1), except that the temperatures were set at 215°/235°/230°/230° C.

Blend (B10) was made of 40 parts of polymer (D5/E1) and 60 parts of resin (C2) in the same manner as blend (B9).

Blend (B11) was made of 45 parts of polymer (D5/E1) and 55 parts of resin (C2) in the same manner as blend (B9).

In each case, polymer (D5/E1) was the continuous phase, while imidized acrylic resin was the dispersed phase.

All the final PVC compositions were extruded in the same equipment and using the same procedure as in Examples 34–37, except that the temperatures were set at 165°/175°/175°/175° C.

TABLE IX

| Example | (A3) | (B9) | (B10) | (B11) | Flex mod. MPa | HDT 80° C. °C. | N. Izod* N. m/m | N. Izod 80° C. N. m/m |
|---|---|---|---|---|---|---|---|---|
| 53 | 100 | 0 | 0 | 0 | 2586 | 70 | 1227 | 122.7 |
| 54 | 80 | 20 | 0 | 0 | 2310 | 82 | 1014 | 774.0 |
| 55 | 70 | 30 | 0 | 0 | 2241 | 92 | 800.7 | 587.2 |
| 56 | 70 | 0 | 30 | 0 | 2137 | 88 | 827.4 | 560.5 |
| 57 | 70 | 0 | 0 | 30 | 2068 | 86 | 854.1 | 693.9 |

*Unannealed

It is seen in the above Table IX that the samples of Examples 54–57, according to the present invention had an increased HDT, while at the same time maintaining the impact strength at an acceptable level of ductile, rather than brittle, break. HDT in Examples 54–57 was much higher than in the control Example 53 but with ductile break. A combination of these two properties is the most desirable PVC characteristic in the industry.

What is claimed is:

1. A process for the manufacture of a polyvinyl chloride composition having an improved heat distortion temperature, said process comprising blending at a temperature set within a range of about 150°–220° C.

(A) 50–95 parts by weight of polyvinyl chloride with (B) a complementary amount, the total adding to 100 parts by weight, of a polymer blend, comprising a matrix and a dispersed phase, consisting essentially of about (i) 30–85 weight percent of a dispersed phase of an imidized acrylic resin having a glass transition temperature above 150° C., as determined according to ASTM standard D3418, taking the midpoint value, and a flexural modulus of at least 690 kPa wherein at least 20% of ester groups originally present in the resin are imidized to units of the following formula (1):

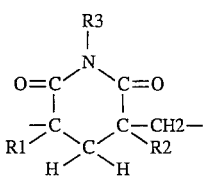

wherein each one of R1, R2, and R3 independently is hydrogen or a $C_1$–$C_{20}$ alkyl, cycloalkyl, or aryl group, said imidized acrylic resin further containing 0–50 weight percent of a copolymerized ethylenically unsaturated additional monomer and being substantially free of functional groups capable causing degradation of polyvinyl chloride within the temperature range of about 150°–220° C.; said resin being melt-processable at a temperature within the range of about 200° to 300° C.;

(ii) 15–70 weight percent of a matrix of a third polymer, which is melt-processable throughout the temperature range of about 150° to 300° C. and is substantially free of functional groups capable of causing degradation of imidized acrylic resin within the temperature range of about 200°–300° C. and of polyvinyl chloride within the temperature range of about 150°–220° C.; said polymer blend (B) of imidized acrylic resin (i) with third polymer (ii) being melt-processable below about 220° C.;

blending of polyvinyl chloride with polymer blend (B) being conducted under such temperature and shear conditions that blend (B) becomes dispersed in polyvinyl chloride; and substantially all of the imidized acrylic resin (i) forms compatible, single-phase composition with polyvinyl chloride.

2. A process of claim 1 wherein each one of R1, R2, and R3 is methyl.

3. A process of claim 1 wherein and the degree of imidization of the resin is about 60–100%.

4. A process of claim 3 wherein the glass transition temperature of imidized acrylic resin (i) is about 155°–165° C., as determined according to ASTM standard D3418, taking the midpoint value.

5. A process of claim 1 wherein the temperature at which polyvinyl chloride is blended with blend (B) is about 160°–210° C.

* * * * *